3,639,615
PROCESS FOR THE TREATMENT OF BENIGN PROSTATIC HYPERTROPHY
Edward Y. Domina, 61 Highland Ave.,
Arlington, Mass. 02174
No Drawing. Continuation of application Ser. No. 277,096, May 1, 1963, which is a continuation-in-part of application Ser. No. 684,857, Sept. 19, 1957. This application Apr. 10, 1969, Ser. No. 815,216
Int. Cl. A61k 27/00
U.S. Cl. 424—280                                2 Claims

ABSTRACT OF THE DISCLOSURE

Disclosed is a preparation for the treatment of benign prostatic hypertrophy in adult male humans consisting of glutamic acid, 45% to 65% by weight; alanine, 15% to 30% by weight; glycine, 7% to 15% by weight; and ascorbic acid, 5% to 15% by weight.

---

This invention or discovery relates to a preparation for the treatment of benign, or non-tumorous, prostatic hypertrophy, or prostatism; and pertains more particularly to a new combination of certain amino acids, which has proved to be effective in relieving the usual symptoms of uncomplicated enlargement of the prostate gland. This application is a continuation of my pending application Ser. No. 277,096 filed May 1, 1963, and now abandoned, which is a continuation-in-part of application Ser. No. 684,857 filed Sept. 19, 1957, which is now abandoned.

The purpose of the invention is to provide a preparation composed of three pure amino acids and ascorbic acid, which may be dispensed in capsule or tablet form for oral administration and which, when taken as directed, will partially or completely relieve the symptoms commonly associated with benign prostate hypertrophy, such as discomfort, nocturia, delayed micturition, frequent urination, abnormal continence and urgency.

It is well recognized that the large family of amino acids are the "building stones" of the protein molecule and the end products of protein hydrolysis or digestion in the gastro-intestinal tract, and that many of such acids are essential or semi-essential for normal metabolism and complete nutrition in a healthy human. Some of these acids, in pure or free form, have been administered parenterally in cases of extreme malnutrition and in post-operative treatment, with beneficial results in restoring proper metabolism. Many of the amino acids in the bound or converted form of protein hydrolysates, and in association with various minerals and vitamins, have been used as dietary supplements for nutritional purposes or hyperalimentation. So far as I am aware, none of the pure amino acids were used therapeutically for any purpose except supplemental nutrition, before my discovery of the effectiveness of the preparation herein disclosed as a palliative for non-tumorous prostatic hypertrophy.

The differences in properties and purposes between the pure or free amino acids and the bound or converted amino acids, found in protein hydrolysates in the form of peptides, polypeptides or peptones, derived from casein or yeast, are well appreciated. The free acids are absorbed directly the abdominal tissues without digestion; whereas, the bound or semi-bound acids must be digested, and the digested acids are subsequently absorbed, transported and absorbed by the cells and tissues at a different rate. The pure acids are free from contamination; whereas, the hydrolysates are subject to bacterial contamination. The free acids produce no side effects; whereas, the bound acids tend to cause nausea, vomiting and headaches. My combination of pure amino acids is constant and stable; whereas, protein hydrolysates vary widely in composition, particularly in source of protein and selection of mineral constituents, which effect the rate of transport in the blood stream and the rate of absorption by utilizing cells and tissues.

The specific action of the members of the large family of amino acids as detoxicants, as hormonal components, or as components of numerous enzyme systems, and the significance and metabolic interrelationships of these acids in the human system, is largely unknown or unappreciated; and there is still much to be learned by further research in the field of biochemistry respecting protein nutrition of living tissues and the relationship of the amino acids to human metabolism. It is known that at least ten of the amino acids are considered essential to life. The three employed in my novel preparation, namely, glutamic acid, alanine and glycine, are not in that essential group. They are now classified among the semi-essential amino acids which were formerly incorrectly called non-essential.

The present discovery resulted from studies of the fundamental research in amino acids, and the correlation of the findings resulting from those studies and findings resulting from use of the three selected acids in the treatment of patients, in conjunction with deducible appreciation of their value in the field of therapeutics as well as in the field of nutrition. Although the use of these three acids, alone, in clinical tests of benign prostatism conditions affords effective results (article by Drs. Feinblatt and Gant in the Journal of the Main Medical Association, March 1958, entitled "Palliative Treatment of Benign Prostatic Hypertrophy"; and article by Dr. Damrau in the Journal of the American Geriatrics Society, May 1962, entitled "Benign Prostatic Hypertrophy: Amino Acid Therapy for Symptomatic Relief"), I have found that improved results are obtainable when ascorbic acid is included as a synergistic component of the preparation.

The addition of ascorbic acid, or vitamin C, assists in promoting relief more quickly and effectively because of its detoxifying action in counteracting infections and poisons; its importance to tissue integrity and repair, particularly in the integrity of the walls of capillary blood vessels; its function in oxidation-reduction reactions in the biochemistry of the body; and its assistance in improving diuresis. The ascorbic acid is believed to be synergistic with the amino acids, due to its functions in enzyme systems of the body.

It is thought by some physicians that the efficacy of the novel preparation is due, in part, to its diuretic action in reducing the swelling of the prostate gland, and associated perineal tissues, but the precise physiological chemistry remains to be demonstrated by further research. If it were merely a matter of adjusting diuresis, then well known and widely used diuretics should give the same relief and reduce the enlargement of the gland; but such diuretics are incapable of achieving the desired results.

The clinical tests referred to above, and many additional field treatments conducted by practitioners since my original application was filed, have demonstrated that the amino acids in my palliative preparation are not only effective but also safe to use and produce no side effects. In those tests, the dosage schedule was two 6-grain capsules three times a day for two weeks, and thereafter one capsule three times daily, for a total period of two to three months. Partial or complete relief of symptoms resulted in a high majority of the treated patients.

My new composition is prepared by mixing the ingredients, each in a powdered or granular form, in the following proportions by weight:

Glutamic acid, HOOC.CH(NH$_2$).CH$_2$.CH$_2$.COOH, 45% to 65%, and preferably about 56%.
Alanine, HOOC.CH(NH$_2$).CH$_3$, 15% to 30%, and preferably about 22%.
Glycine, HOOC.CH$_2$(NH$_2$), 7% to 15%, and preferably about 11%.
Ascorbic acid, C$_6$H$_8$O$_6$, 5% to 15%, and preferably about 11%.

The preferred formulation is thus, approximately, 5 parts glutamic acid; 2 parts alanine; 1 part glycine; and 1 part ascorbic acid. These approximate proportions of the ingredients are important for optimum results in relieving or reducing the discomforting symptoms of benign prostatic hypertrophy; and it is also important, as aforesaid, that the amino acid components be in the pure or free state, as contrasted with the bound or converted (semi-bound) acids of a protein hydrolysate.

The protein hydrolysates and the parenterally administered amino acids, previously mentioned, have not been, and, in my opinion as a biochemist, could not be effective to any recognizable degree in treating prostate enlargement, which is due to an increase in the size of its constituent cells rather than to the presence of abnormally large amounts of fluid in its intercellular tissue spaces (as in the case of nutritional edema); and I am not aware of any medical product or preparation which has previously been tried, effectively or otherwise, in a realistic attempt to treat benign prostatic hypertrophy, a condition which is characteristic of at least 90% of all cases of prostate enlargement.

I claim:
1. A process for the treatment of benign prostatic hypertrophy in adult male humans having benign prostatic hypertrophy which comprises administering orally to said male an effective amount of a composition consisting of glutamic acid, 45% to 65% by weight; alanine, 15% by weight; glycine, 7% to 15% by weight and ascorbic acid, 5% to 15% by weight.
2. A process for the treatment of benign prostatic hypertrophy in adult male humans having benign prostatic hypertrophy which comprises administering orally to said male an effective amount of a composition consisting of, in the approximate stated proportions by weight, glutamic acid, 5 parts; alanine, 2 parts; glycine, 1 part; and ascorbic acid, 1 part.

References Cited

Annals of Surgery, January 1947, p. 41—advertisement by Walker Vitamin Products, Inc.

Feinblatt et al.: J. of Maine Med. Assoc., March 1958, 4 pages.

STANLEY J. FRIEDMAN, Primary Examiner

D. M. STEPHENS, Assistant Examiner

U.S. Cl. X.R.
424—319